(12) United States Patent
Atkinson

(10) Patent No.: US 6,715,349 B2
(45) Date of Patent: Apr. 6, 2004

(54) FLUID-GAUGING SYSTEMS AND METHODS

(75) Inventor: Harry Atkinson, Wokingham (GB)

(73) Assignee: Smiths Group PLC (GB)

( * ) Notice: Subject to any disclaimer, the term of this patent is extended or adjusted under 35 U.S.C. 154(b) by 0 days.

(21) Appl. No.: 10/156,855

(22) Filed: May 30, 2002

(65) Prior Publication Data

US 2002/0178809 A1 Dec. 5, 2002

(30) Foreign Application Priority Data

May 30, 2001 (GB) .............................. 0113611

(51) Int. Cl.$^7$ .............................................. G01F 23/00
(52) U.S. Cl. .................... 73/304 R; 73/290 R; 340/623
(58) Field of Search ........................ 73/290 R, 304 R; 340/623

(56) References Cited

U.S. PATENT DOCUMENTS

| 3,290,786 | A | * | 12/1966 | Parkin | ........................ 318/584 |
| 3,818,760 | A | | 6/1974 | Howard et al. | |
| 4,553,216 | A | | 11/1985 | Stevens et al. | |
| 5,138,559 | A | | 8/1992 | Kuehl et al. | |
| 5,207,099 | A | * | 5/1993 | Baker | ........................... 73/292 |
| 6,157,894 | A | * | 12/2000 | Hess et al. | ..................... 702/54 |
| 6,332,358 | B1 | * | 12/2001 | Atkinson | .................. 73/304 R |

FOREIGN PATENT DOCUMENTS

GB 2352523 A 1/2001

* cited by examiner

Primary Examiner—Hezron Williams
Assistant Examiner—Katina Wilson
(74) Attorney, Agent, or Firm—Connolly Bove Lodge & Hutz LLP

(57) ABSTRACT

An aircraft fuel-gauging system has multiple ultrasonic gauging probes providing fuel height outputs at several locations within a tank. The output of an inertial sensor is used to compute the attitude of the fuel surface with respect to the tank. The system uses the attitude information to determine whether outputs from a group of two or more probes are compatible with one another. Where a probe is identified as having an output incompatible with the fuel surface attitude and the outputs of other probes its output is excluded from the computation of the fuel quantity.

11 Claims, 1 Drawing Sheet

FLUID-GAUGING SYSTEMS AND METHODS

BACKGROUND OF THE INVENTION

This invention relates to fluid-gauging systems and methods.

Aircraft fuel tanks usually have several probes disposed to measure the height of fuel within the tank at different locations. A Boeing 777 inner wing tank, for example, has eight probes used in fuel height measurement. Probes may be of any conventional kind, such as capacitive or ultrasonic probes. The probes are preferably located in a non-linear fashion, that is so that the locations of no three probes lie on a straight line. In this way, the maximum information can be obtained about the orientation of the surface plane of the fuel. In practice, however, it is not usually possible to locate all probes within a tank so that no three are arranged in a straight line or an almost straight line (that is, with none co-linear) because of limited availability of fixing points, intrusions into the tank and other factors.

The construction of fuel-gauging probes can make them prone to false readings if, for example, there is a blockage of fuel flow into or out of the probe, an accumulation of foam within the probe, adverse thermal stratification conditions, water contamination, damage to the probe or the like. Because the fuel surface may be moving within the tank at some times and be stationary at other times, it is not always immediately apparent when a probe is providing a false height reading.

GB 2352523 describes an aircraft ultrasonic fuel-gauging system having a number of gauging probes in a tank arranged so as to include at least one set of three co-linear probes. The outputs of the probes are supplied to a unit that checks the operation of the probes in co-linear sets by extrapolating height at one of the probes from the outputs of the other probes. Where there are at least two sets of co-linear probes having a common probe it is possible uniquely to identify if that common probe is faulty. The system rejects any faulty probe and uses only the outputs of other probes in computations of fuel quantity. Although this system can function well it may not be suitable for tanks having only a small number of groups of three co-linear probes.

BRIEF SUMMARY OF THE INVENTION

It is an object of the present invention to provide an alternative fluid-gauging system and method.

According to one aspect of the present invention there is provided a system for gauging the quantity of liquid in a vehicle tank including at least three probes arranged to measure the height of liquid at a plurality of different locations within the tank, sensor means for providing an output representative of the attitude of the liquid surface with respect to the tank, and means for comparing the output of a group of at least two of said probes with the attitude derived from the sensor means to determine whether the probe outputs are compatible with the sensed liquid attitude.

The system is preferably arranged to provide an output of liquid quantity derived from only those probes having outputs compatible with the sensed liquid attitude. The sensor means may include inertia sensing means. The probes are preferably acoustic gauging probes. The liquid may be fuel and the vehicle may be an aircraft.

According to another aspect of the present invention there is provided a method of fluid-gauging including the steps of receiving outputs from a set of at least two probes, providing an indication of the height of fluid at each of said probes, receiving an output representative of the attitude of the fluid surface with respect to the probes, and using the attitude output to determine whether the indication of fluid height provided by any of the probes is incompatible with the height provided by any others of the probes.

The method preferably includes the step of providing an output indicative of fluid quantity derived from only those probes having outputs compatible with the sensed fluid attitude. The output representative of attitude is preferably derived inertially.

According to a further aspect of the present invention there is provided a system for performing a method according to the above other aspect of the invention.

An aircraft fuel-gauging system and method according to the present invention, will now be described, by way of example, with reference to the accompanying drawing.

DETAILED DESCRIPTION OF THE PREFERRED EMBODIMENT

Figure 1:
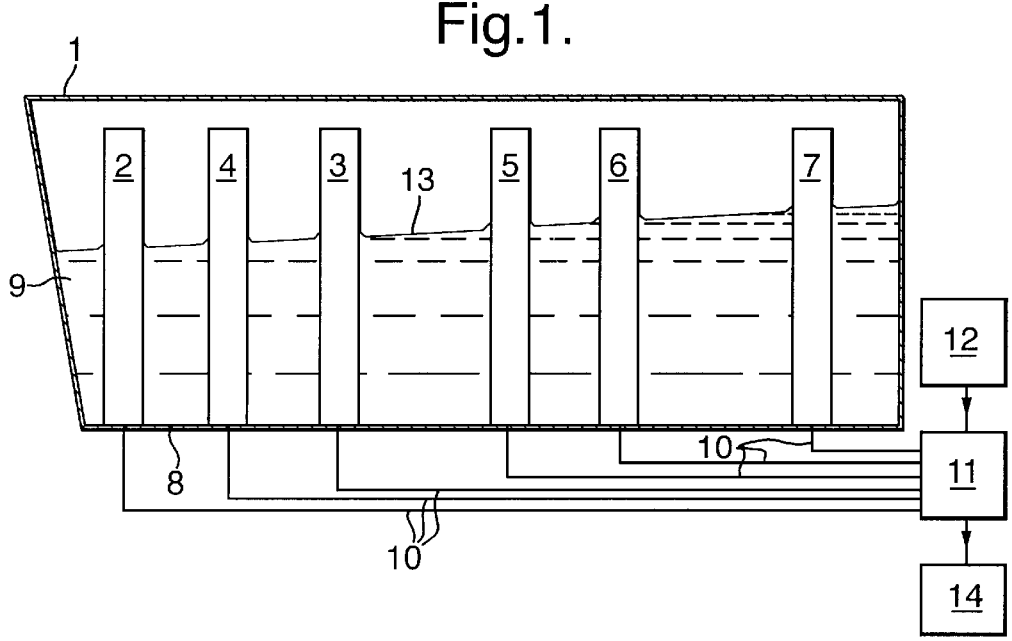
FIG. 1 is a schematic side elevation view of a system having six probes.

The system includes a fuel tank 1 having six conventional ultrasonic, acoustic fuel-gauging probes 2 to 7 mounted substantially vertically on or above the floor 8 of the tank to project upwardly within fuel 9 in the tank. The probes 2 to 7 are mounted at different locations designated A to F in FIG. 2. Cables 10 connect the probes 2 to 7 with a processing or fuel-gauging unit 11, which supplies signals to the probes in the usual way and receives their outputs.

An inertial reference system IRS 12, which is a part of the aircraft navigation system or which may be separate from this, provides an output to the fuel-gauging unit 11 representative of the attitude of the aircraft. It can be seen that this output also provides information as to the steady state attitude of the fuel surface 13 relative to the tank 1.

The present invention requires a group of at least three active probes in order to obtain an accurate fuel quantity measurement.

The fuel-gauging unit 11 calculates the height of fuel at each of the probes 2 to 7. In practice, not all of the probes will be active all the time because some probes may be dry or fully immersed in fuel so these are rejected. The fuel-gauging unit 11 uses the information from the IRS 12 about the angle of the fuel surface 13 to check whether the height information from any of the probes 2 to 7 is incompatible with information from others of the probes. The unit 11, for example, may take the height information from one probe and use the attitude information to extrapolate from this the expected fuel height at the others of the active probes. If the height information provided by the outputs of these other probes is within certain limits of the extrapolated heights then the unit 11 determines that all the probes are functioning correctly. If, however, there is a discrepancy, this indicates that one of the probes is faulty. Where a group of two probes is used it is possible to determine whether that group of probes is consistent. For example, if the height extrapolated from probe A is compatible with the height indication provided by probe B then that group is consistent. This could be checked readily by extrapolating the height instead from the other probe B to A. By combining the consistency results from groups with common probes, single faults in the common probes can be detected. Using different combinations of consistency results from various probe groups enables multiple probe faults to be detected.

Figure 2:
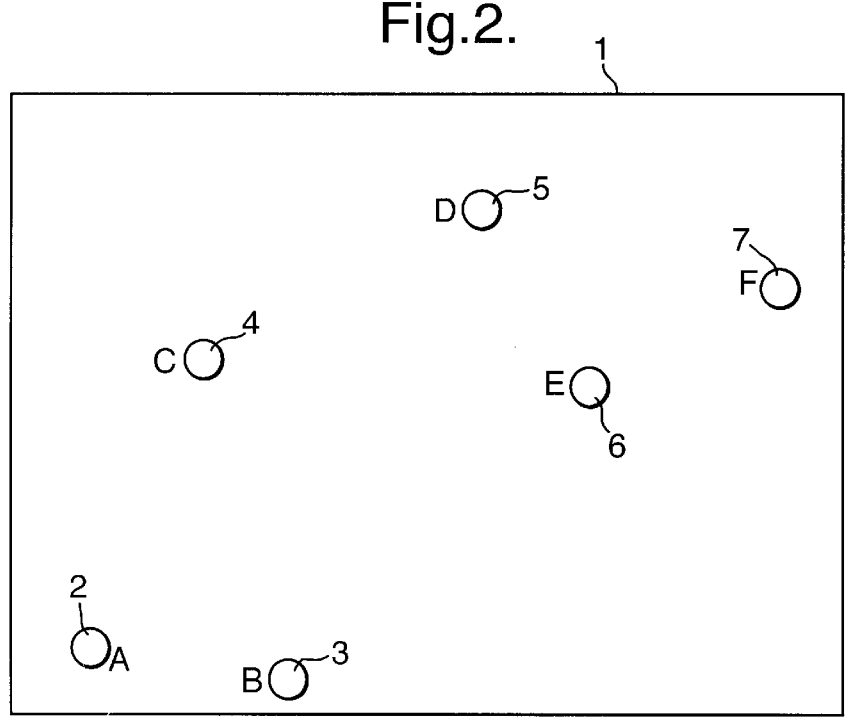
FIG. 2 is a plan view of the tank and probes of the system shown in FIG. 1.

For example, with reference to FIG. 2, if the height readings from probes A and C, and A and B are inconsistent while those from C and D, and B and E are consistent then probe A is most likely to be faulty. Similarly, if groups C and D, and B and E are consistent but groups D and F, and E and F are inconsistent then probe F is most likely to be faulty. In this situation the position and attitude of the fuel surface can be calculated because outputs are available from at least three non-faulty probes, namely the four probes C, D, B and E.

Alternatively, the unit 111 could be arranged to calculate the angle of the fuel surface 13 from the outputs of the probes not likely to be faulty and compare this with the angle derived from the IRS 12. If the two angles are within predetermined limits it is determined that all the probes are operating correctly. If, however, there is a discrepancy, the faulty probe can be identified by the method described above.

After identifying any faulty probes, the fuel-gauging unit 11 calculates the volume of fuel 9 from knowledge of the shape of the tank 1 and the height at the locations only of correctly functioning probes. Using a density measurement, such as from a densitometer (not shown), the unit 11 calculates the mass of fuel and provides an output to a display or other utilization means 14.

The invention enables incorrectly operating probes to be identified so that the fluid gauging can be performed with only those probes that are functioning correctly, thereby enhancing the accuracy of the system.

The attitude information need not be provided by an inertial sensor but could, for example, be an inclinometer or some other device that provides an output indicative of the angle of the steady state fuel surface. It will be appreciated that the invention is not confined to gauging in aircraft or to gauging of fuel but could be used in any vehicle liquid-gauging system having at least three height-measuring probes. The invention is not confined to acoustic probes but could be used with other forms of height-measuring probes such as capacitive probes or a mixture of different types of probes.

What I claim is:

1. A system for gauging the quantity of liquid in a vehicle tank comprising: at least three probes, said probes being arranged to measure the height of liquid at a plurality of different locations within said tank; a sensor arranged to provide an output representative of the attitude of the surface of said liquid with respect to said tank; and a processing unit arranged to compare outputs of a group of at least two of said probes with said attitude derived from said sensor to determine whether the probe outputs are compatible with the attitude, and wherein said processing unit is arranged to provide an output representative of liquid quantity derived from only those of said probes having outputs compatible with said attitude.

2. A system according to claim 1, wherein said sensor is an inertial sensor.

3. A system according to claim 1, wherein said probes are acoustic gauging probes.

4. A system according to claim 1, wherein said liquid is a fuel.

5. A system according to claim 1, wherein said vehicle is an aircraft.

6. A system for gauging the quantity of liquid in a vehicle tank comprising: at least three gauging means for gauging the height of said liquid at a plurality of different locations in said tank; sensor means arranged to provide an output representative of the attitude of the surface of said liquid with respect to said tank; means for comparing outputs of a group of at least two of said gauging means with said attitude to determine whether the outputs of said gauging means are compatible with the attitude; and means for deriving an indication of liquid quantity from only those of said probes having outputs compatible with the attitude.

7. A system for gauging the quantity of fuel in an aircraft tank comprising: at least three acoustic-gauging probes, said probes being arranged to measure the height of fuel at a plurality of different locations within said tank; an inertial sensor arranged to provide an output representative of the attitude of the surface of said fuel with respect to said tank; and a processing unit arranged to compare outputs of a group of at least two of said probes with said attitude derived from said inertial sensor to determine whether the probe outputs are compatible with the attitude and wherein said processing unit is arranged to provide an output of fuel quantity derived from only those of said probes having outputs compatible with the attitude.

8. A method of fluid-gauging comprising the steps of: receiving outputs from a set of at least two probes; providing an indication of height of fluid at each of said probes; receiving an attitude output representative of the attitude of the surface of said fluid with respect to said probes; using said attitude output to determine whether said indication of fluid height provided by any of said probes is incompatible with said indication of height provided by any other of said probes; and deriving an indication of fluid quantity from only those of said probes providing a fluid height indication compatible with said attitude output.

9. A method according to claim 8, wherein said output representative of attitude is derived inertially.

10. A fuel-gauging method comprising the steps of: producing outputs from a set of at least two fuel-gauging probes; calculating height of fuel at each of said probes; providing an output representative of an attitude of the surface of said fuel; using said attitude output to determine whether said calculated fuel height at any of said probes is incompatible with said calculated fuel height at any others of said probes; and providing an output of fuel quantity derived from calculated fuel heights at only those of said probes where the calculated fuel height is compatible with the attitude.

11. A method according to claim 10, wherein said fuel-gauging probes are ultrasonic probes and wherein said attitude output is provided by an inertial sensor.

* * * * *